United States Patent
Chen et al.

(10) Patent No.: US 7,042,200 B2
(45) Date of Patent: May 9, 2006

(54) SWITCHING MODE POWER CONVERSION WITH DIGITAL COMPENSATION

(75) Inventors: Jun Chen, Allen, TX (US); Keith Kunz, Bryan, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/408,530

(22) Filed: Apr. 7, 2003

(65) Prior Publication Data

US 2004/0196013 A1    Oct. 7, 2004

(51) Int. Cl.
*G05F 1/40* (2006.01)
(52) U.S. Cl. ...................................... 323/283
(58) Field of Classification Search ................ 323/282, 323/283, 284, 367, 369
See application file for complete search history.

(56) References Cited

U.S. PATENT DOCUMENTS 5,652,537 A * 7/1997 Fleeman ...................... 327/358
6,555,996 B1 * 4/2003 Drori et al. .................. 323/369

* cited by examiner

*Primary Examiner*—Adolf Bethane
(74) *Attorney, Agent, or Firm*—W. Daniel Swayze, Jr.; W. James Brady; Frederick J. Telecky, Jr.

(57) ABSTRACT

The present invention provides improved line and load regulation of a switching-mode power converter (300) without requiring additional capacitors (255), either internally or externally, to stabilize the control loop. The present invention can provide this by integrating a digital compensator (375) with the pulse-width modulator ("PWM") of the switching-mode power converter. Such a compensator (375) can include comparators (310 and 330), digital circuits (340), and resistors (215, 220, 320, and 325).

21 Claims, 5 Drawing Sheets

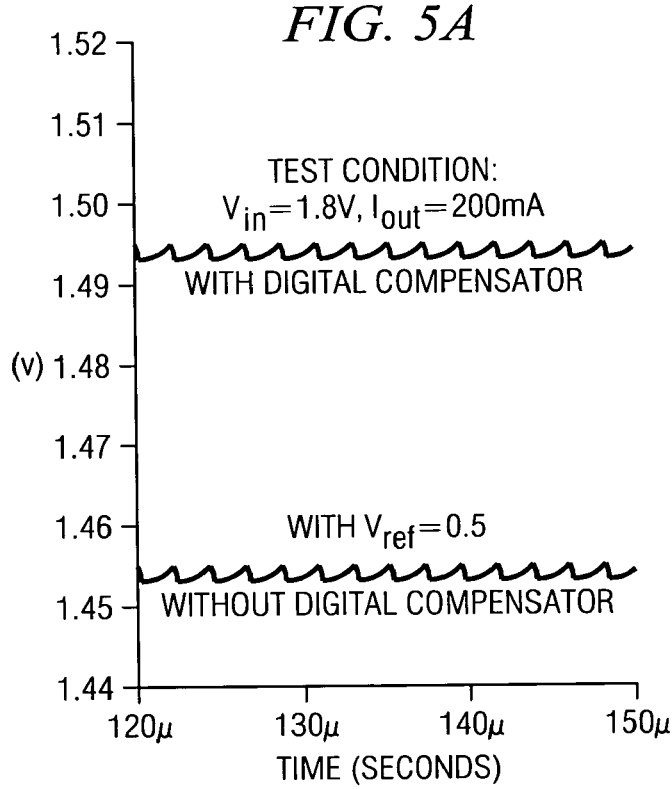
*FIG. 5A*
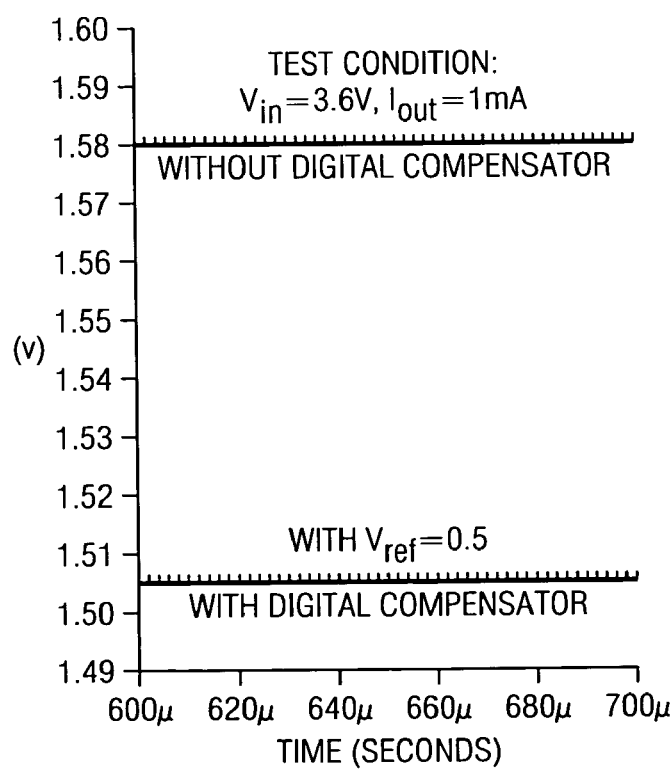

SWITCHING MODE POWER CONVERSION WITH DIGITAL COMPENSATION

FIELD OF THE INVENTION

The invention relates generally to power conversion and, more particularly, to a digital compensator capable of improving line and load regulation in switching-mode power converters.

BACKGROUND OF THE INVENTION

Because of their high power efficiency, pulse-width modulator ("PWM") switching-mode buck converters are widely used in portable electronic equipment, such as cellular phones, MP3 players and digital cameras, to power digital signal processors ("DSP") and other digital circuits. Buck converters step down the battery voltage and regulate the output voltage against variations from the battery and the load current.

There are various PWM-controlled buck converters used in power management applications. Because it requires fewer external components (e.g., compensation capacitors, resistors, and pins), has a fast response to the line and load disturbance, and uses a very simple design, conventional buck converter 100, as diagrammatically illustrated in FIG. 1A, is commonly used in many portable applications, such as cellular phones. Switch 105 of buck converter 100, conventionally implemented with PMOS, can be controlled by a fixed period and variable on-time control signal supplied to its gate from output 112 of comparator 110. Input voltage $V_{in}$ is fed into the source of switch 105. Diode 135 is connected at a first end to input voltage $V_{in}$, opposite the source of switch 105, and at a second end to the drain of switch 105. Inductor (L) 130 is connected at a first end to the source of switch 105 and at a second end to a first end of capacitor (C) 140. Capacitor 140 is connected at a second end to input voltage $V_{in}$, opposite the source of switch 105. Resistor (R1) 115 is connected at a first end to the second end of inductor 130 and at a second end to resistor (R2) 120. Resistor 120 is connected at a second end to input voltage $V_{in}$, opposite the source of switch 105. Output voltage $V_{out}$ (at the intersection of inductor 130, capacitor 140 and resistor 115) can be determined by the turn-on time of switch 105 and input voltage $V_{in}$. Output voltage $V_{out}$ can be divided down by a resistor divider, including series resistors 115 and 120, taken from the intersection of resistors 115 and 120, and fed back to input 108 of comparator 110 as feedback voltage $V_{fb}$. Comparator 110 compares feedback voltage $V_{fb}$ with ramp signal 125 (such as illustrated in FIG. 1B), which can be input to comparator 110 at input 106. Ramp signal 125, in the embodiment shown in FIG. 1B, has a constant frequency and fixed amplitude. When output voltage $V_{out}$ varies, the duty-cycle of the output signal of comparator 110 will correspondingly change. Because the output signal of comparator 110 can be used to control the turn-on time of switch 105, output voltage $V_{out}$ can be kept relatively constant. Buck converter 100 has a very fast response to the line and load change, but its line and load regulation ability is limited by its loop gain. Output voltage $V_{out}$, in continuous conduction mode ("CCM"), can be found as follows:

$$V_{out} = \frac{V_{ref} + \Delta V}{\frac{R_2}{R_1 + R_2} + \frac{\Delta V}{V_{in}}}, \qquad \text{Equation 1}$$

where $V_{ref}$ and $\Delta V$ are voltages of ramp signal 125, as illustrated in FIG. 1B.

One approach to improve line and load regulation of buck converter 100, is to add loop 275, which has high gain, as shown in FIG. 2, to buck converter 100, forming buck converter 200. Loop 250 of buck converter 200 includes all the elements of buck converter 100 plus adder 225, into which feedback voltage $V_{fb}$ is fed. Loop 275 can provide additional compensation for the variation in output voltage $V_{out}$. Loop 275 includes a resistor divider, including resistor R3 215 in series with resistor R4 220, which is connected in parallel with series resistors 115 and 120. An end of resistor 215, opposite resistor 220, is connected to the first end of resistor 115, while an end of resistor 220, opposite resistor 215, is connected to the second end of resistor 120. Output voltage $V_{out}$ can be divided down by the resistor divider of loop 275, including series resistors 215 and 220, taken from the intersection of resistors 215 and 220, and fed back to input 208 of comparator 210 as voltage 217. Reference voltage $V_{ref}$ is fed into comparator 210 at input 206. Output 212 of comparator 210 is connected to adder 225, thereby supplying signal 221 to adder 225. Adder 225 adds feedback voltage $V_{fb}$ and signal 221 and provides the result to comparator 110, via input 108. Since loop 275 has high gain, capacitor ($C_c$) 255, connected between input 208 and output 212 of comparator 210, is needed to stabilize the loop as follows:

$$C_c \times (R_3 // R_4) >> \sqrt{L \times C}. \qquad \text{Equation 2}$$

Capacitor 255 has a large capacitance. Therefore, if capacitor 255 is integrated on the control chip of buck converter 200, it will require a lot of silicon area. Conventionally, capacitor 255 is implemented externally, possibly requiring an extra pin from the control chip.

It is therefore desirable to provide a solution that improves the line and load regulation of a switching-mode power converter without requiring additional capacitors, either internally or externally, to stabilize the control loop. Exemplary embodiments of the present invention can provide this by integrating a compensator (or controller) with the PWM of the switching-mode power converter. Such a compensator can include comparators, digital circuits, and resistors.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which:

FIG. 5A graphically illustrates output voltages from both conventional buck converters and from exemplary embodiments of the present invention.

DETAILED DESCRIPTION

While the making and using of various embodiments of the present invention are discussed herein in terms of specific power converters, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention provides a solution that improves the line and load regulation of a switching-mode power converter without requiring additional capacitors, either internally or externally, to stabilize the control loop. The present invention can provide this by integrating a compensator with the pulse-width modulator ("PWM") of the switching-mode power converter. An exemplary embodiment of such a compensator can include comparators, digital circuits, and resistors.

Figure 2:
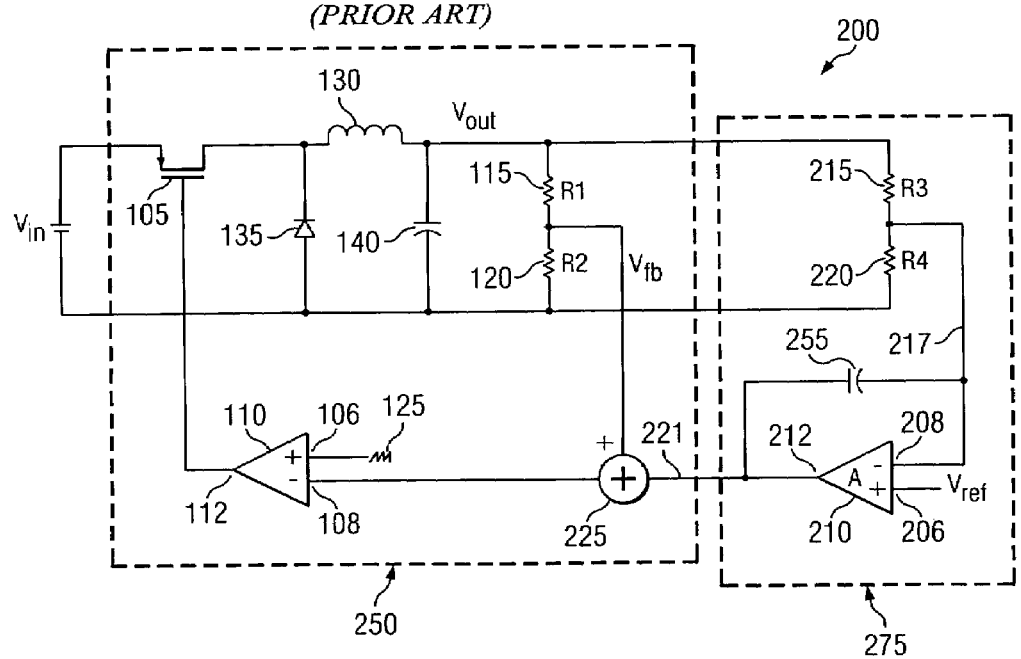
FIG. 2 diagrammatically illustrates a conventional buck converter in accordance with the known art.
Figure 3:
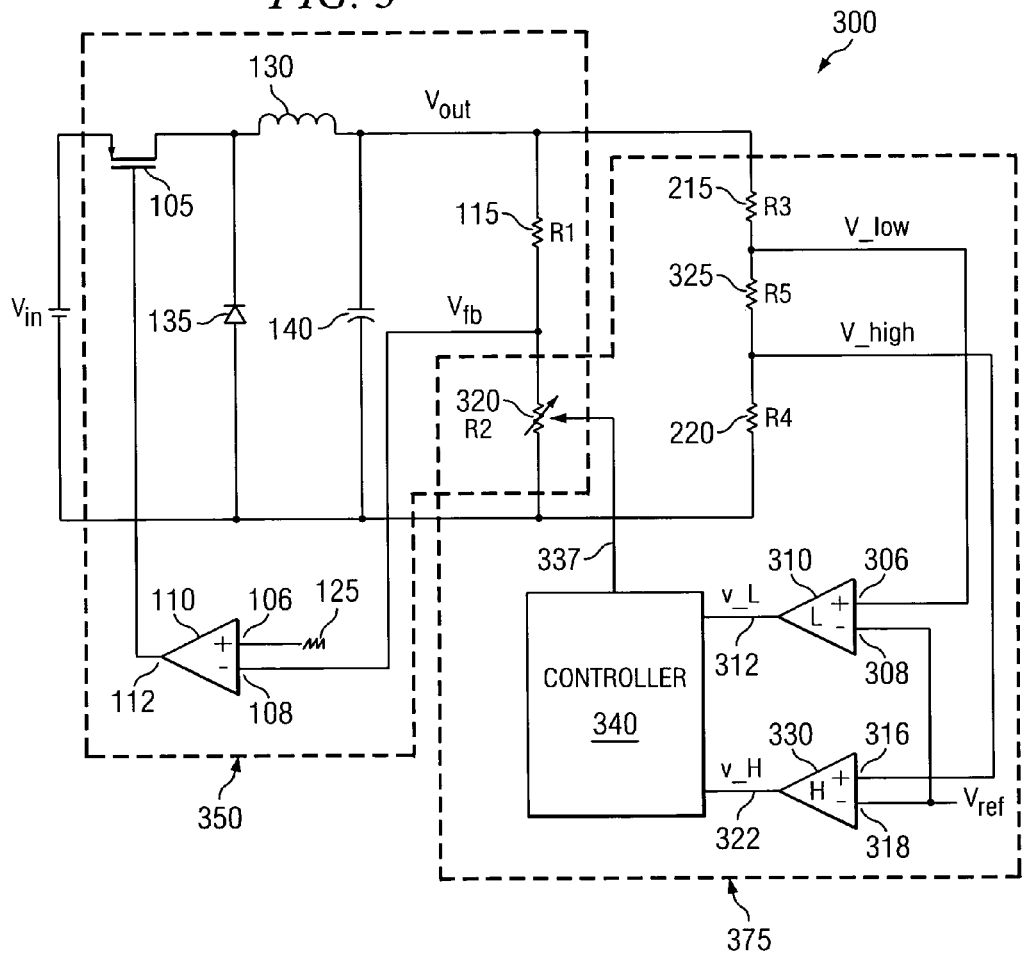
FIG. 3 diagrammatically illustrates a buck converter in accordance with exemplary embodiments of the present invention.

FIG. 3 diagrammatically illustrates buck converter 300 in accordance with exemplary embodiments of the present invention. With the exception of resistor 120, loop 350 of buck converter 300 can remain the same as buck converter 100. In the place of resistor 120, buck converter 300 can include resistor R2 320 as part of both loop 350 and loop 375. Unlike the value of resistor 120 (FIGS. 1 and 2) which remains constant, in some embodiments of the present invention, the value of resistor 320 can vary according to output voltage $V_{out}$. In some embodiments, resistor 320 is a digitally-controlled variable resistor. In some embodiments, loop 375 can adjust the value of resistor 320. Loop 375 can provide more compensation for the variation in output voltage $V_{out}$ than loop 275 (FIG. 2). Because loop 350 can operate in essentially the same manner as buck converter 100 and because of the greater compensation that can be provided by loop 375, a buck converter, such as buck converter 300, in accordance with exemplary embodiments of the present invention can provide a fast response with improved line and load regulation.

Loop 375, which can form a digital compensator in accordance with exemplary embodiments of the present invention, can include: a resistor divider, including resistors R3 215 connected in series to R5 325 opposite R4 220, connected in parallel with series resistors R1 115 and R2 320; a window comparator, including comparators 310 and 330; digital resistance controller 340; and digitally controlled variable resistor 320. In the exemplary embodiment of FIG. 3, the end of resistor 215 that is opposite resistor 325 is connected to the end of resistor 115 that is opposite resistor 320, while the end of resistor 220 that is opposite resistor 325 is connected to the end of resistor 320 that is opposite resistor 115.

Series resistors 215, 325 and 220, which form a resistor divider in the exemplary embodiment of FIG. 3, can set a hysteresis window for comparators 310 and 330, which form a window comparator in the exemplary embodiment of FIG. 3. The upper limit of the hysteresis window can be identified as V_high. The lower limit can be identified as V_low. Output voltage $V_{out}$ of buck converter 300 can be set such that $V_{ref}$ is between V_high and $V_{13}$ low. V_low can be taken from the intersection of resistors 215 and 325, and supplied to comparator 310 via input 306. V_high can be taken from the intersection of resistors 325 and 220, and supplied to comparator 330 via input 316. Reference voltage $V_{ref}$ can be fed into comparators 310 and 330 at inputs 308 and 318, respectively. Outputs 312 and 322 of comparators 310 and 330, respectively, can both be coupled to controller 340 and can supply v_L and v_H, respectively, to controller 340. Signal 337 from controller 340 can set the value of resistor 320.

In the exemplary embodiment illustrated in FIG. 3, a window comparator includes comparators 310 and 330. When output voltage $V_{out}$ such that V_high is higher than $V_{ref}$, output v_H of comparator 330 and output v_L of comparator 310 both go high. When output voltage $V_{out}$ is such that V_low is lower than $V_{ref}$, output v_L of comparator 310 and output v_H of comparator 330 both go low. When output voltage $V_{out}$ is such that $V_{ref}$ is within the hysteresis window (i.e., between V_low and V_high), v_L is low and v_H is high.

Figure 4B:
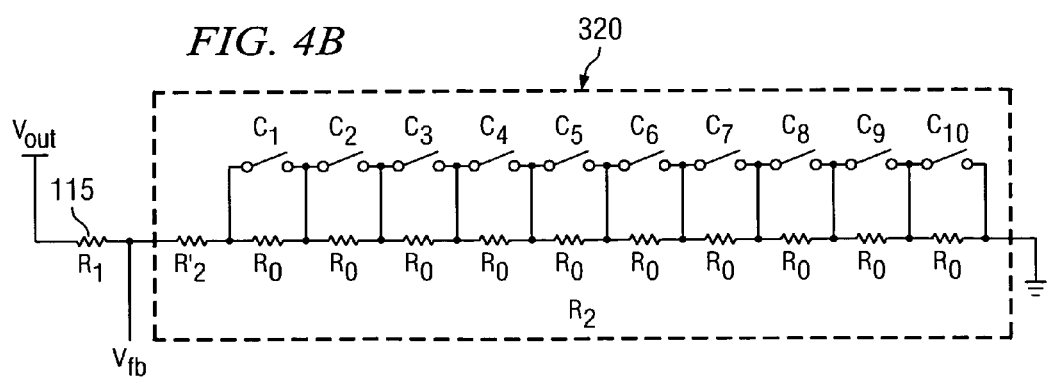
FIG. 4B diagrammatically illustrates resistor 320 (FIG. 3) in accordance with exemplary embodiments of the present invention.

Resistor 320, which can be located in both loop 350 and loop 375, in series with resistor 115 forms a resistor divider in loop 350. In exemplary embodiments of the present invention, the value of resistor 320 can vary according output voltage $V_{out}$. FIG. 4B diagrammatically illustrates resistor 320 in accordance with exemplary embodiments of the present invention. In the exemplary embodiment illustrated in FIG. 4B, signals $c_1$–$c_{10}$ can represent control signals from controller 340. $R_0$ resistors can fine tune resistor 320. When a control signal, such as $c_1$–$c_{10}$, is high, the switch across its corresponding $R_0$ resistor is shorted, thereby reducing resistor 320. When a control signal, such as $c_1$–$c_{10}$, is low, the switch across its corresponding $R_0$ resistor is open, thereby increasing resistor 320. Increasing resistor 320 can reduce the duty cycle of switch 105, reducing output voltage $V_{out}$. Reducing resistor 320 can increase the duty cycle of switch 105, increasing $V_{out}$. Therefore, $V_{out}$ can be regulated with respect to line and load variations.

Figure 4A:
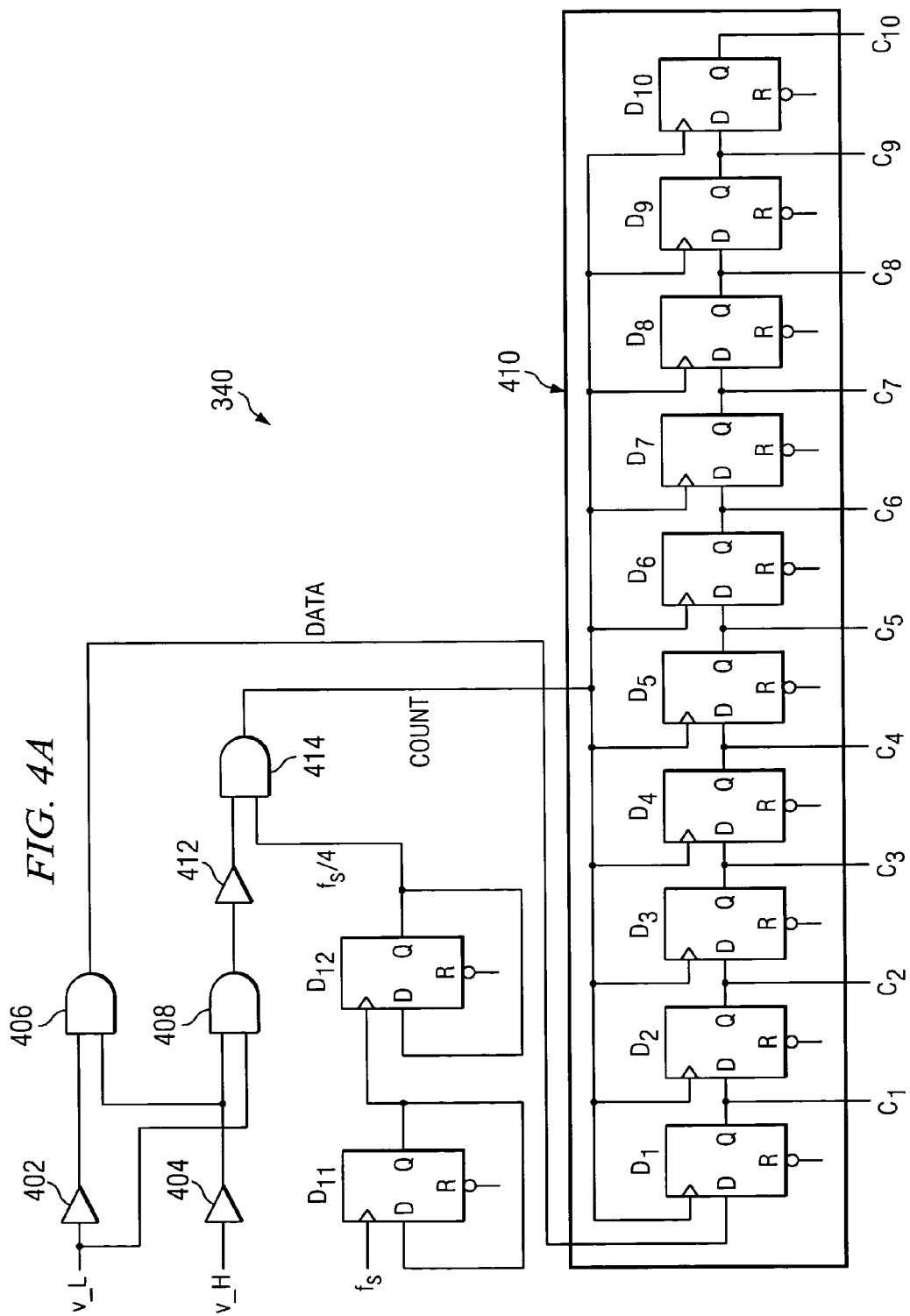
FIG. 4A diagrammatically illustrates controller 340 (FIG. 3) in accordance with exemplary embodiments of the present invention.

In the exemplary embodiment of controller 340 (FIG. 3) illustrated in FIG. 4A, $f_s$ can represent the switching frequency of buck converter 300 and $c_1$–$c_{10}$ can represent control signals for corresponding $R_0$ resistors (FIG. 4B) that can fine tune resistor 320. Inverter 402 and gate 408 can receive v_L from a window comparator, such as formed by comparators 310 and 330 (FIG. 3). Inverter 404 can receive v_H from a window comparator, such as formed by comparators 310 and 330 (FIG. 3). Gate 408 can also receive the output from inverter 404. Gate 406 can receive the output from inverters 402 and 404. The output from gate 406 can be supplied to counter 410. The output from gate 408 can be supplied to inverter 412. Gate 414 can receive the output from inverter 412. Switching frequency $f_s$, for example, the frequency of the ramp signal 125, can be supplied to frequency dividers, such as those formed with D flip-flops $D_{11}$ and $D_{12}$. The output of $D_{12}$ can be supplied to gate 414. In the exemplary embodiment of FIG. 4A, the output of $D_{12}$ is $f_s/4$ because each of D flip-flops $D_{11}$ and $D_{12}$ can contribute a factor of two (2×2=4) to the divisor. The switching frequency divisor, four (4) in the exemplary embodiment of FIG. 4A, can be a design choice. The output from gate 414 can be supplied to counter 410. In some embodiments, gates 406, 408 and 414 can be AND gates.

Figure 1A:
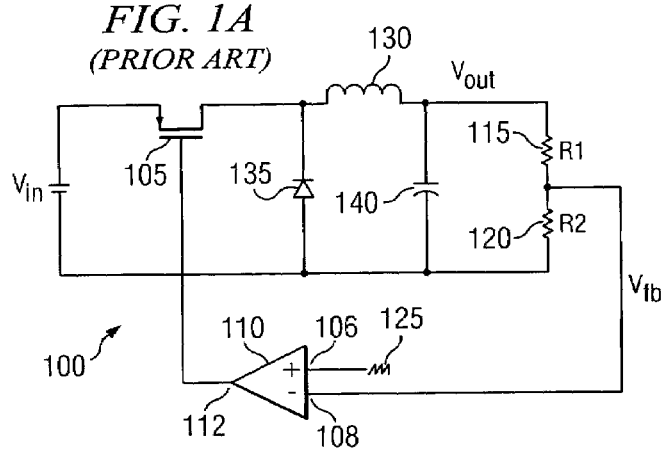
FIG. 1A diagrammatically illustrates a conventional buck converter in accordance with the known art.
Figure 1B:
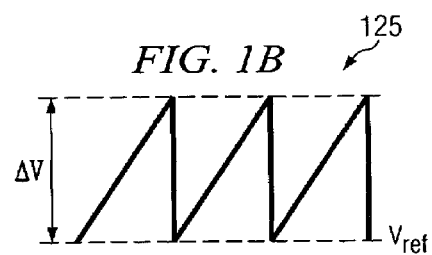
FIG. 1B graphically illustrates a ramp signal in accordance with the known art.

In the exemplary embodiment of controller 340 illustrated in FIG. 4A, counter 410 includes D flip-flops $D_1$–$D_{10}$. In some embodiments, counter 410 is a 10-bit ripple counter. In some embodiments, the data input of counter 410 can be high when output voltage $V_{out}$ is low enough to cause V_low to fall below $V_{ref}$ and the count input is also active at this level of $V_{out}$. The outputs (e.g., $c_1$–$c_{10}$) of counter 410 can become high bit by bit with the clock of counter 410, thereby decreasing the value of resistor 320 until $V_{out}$ is such that $V_{ref}$ falls between V_low and V_high. In some embodiments, the data input of counter 410 can be low when output voltage $V_{out}$ is high enough to cause V_high to rise above $V_{ref}$ and the count input is also active at this level of $V_{out}$. The outputs (e.g., $c_1$–$c_{10}$) of counter 410 can become low bit by bit with the clock of counter 410, thereby increasing the value of resistor 320 until $V_{out}$ is such that $V_{ref}$ falls between V_low and V_high. In some embodiments, as soon as $V_{out}$ is such that $V_{ref}$ falls between V_low and V_high, the count is stopped, holding the state of counter 410. In some embodiments, improved stability can be provided by keeping loop 375 slower than $\sqrt{L \times C}$ (see Equation 2). In order to provide enough delay for loop 375, frequency dividers, such as those formed with D flip-flops $D_{11}$ and $D_{12}$ in the exemplary embodiment of FIG. 4A, can be used to slow down the frequency of counter 410. The number of frequency dividers utilized can be based on the results of Equation 3, below. In the exemplary embodiment of FIG. 4A, the total delay is $40T_s$, where $$T_s\left(\frac{1}{f_s}\right)$$

can represent the switching period, and the delay of count is ten (10) times the clock of counter 410. The total delay is the delay for the buck converter, such as buck converter 300, while the delay of count is the delay for the counter, such as counter 410. The total delay multiplier, forty (40) in the exemplary embodiment of FIG. 4A, can be determined from the value of inductor 130 and the value of capacitor 140 and can be implemented by varying the number of frequency dividers, such as those formed with D flip-flops $D_{11}$ and $D_{12}$, and the number of D flip-flops, such as D flip-flops $D_1$–$D_{10}$. In the exemplary embodiment of FIG. 4A, each of frequency dividers $D_{11}$ and $D_{12}$ slows the switching frequency by a factor of two (2) and each of D flip-flops $D_1$–$D_{10}$ further slows the switching frequency by a factor of one (1). Therefore, in the exemplary embodiment of FIG. 4A, the two (2) frequency dividers, $D_{11}$ and $D_{12}$ slow the switching frequency by a total factor of four (2×2=4) and the ten (10) D flip-flops, $D_1$–$D_{10}$, further slow the switching frequency by a total factor of ten (10×1=10), resulting in a total delay multiplier of forty (4×10=40). The delay of count multiplier, ten (10) in the exemplary embodiment of FIG. 4A, can be decreased, by decreasing the number of D flip-flops, such as D flip-flops $D_1$–$D_{10}$, to make loop 375 operate faster. An increase in the delay of count multiplier, by increasing the number of D flip-flops, such as D flip-flops $D_1$–$D_{10}$, can correspondingly increase the stability of loop 375. In order to keep loop 375 stable, in the exemplary embodiment of FIG. 4A:

$$40T_s \gg 2\pi\sqrt{L \times C} \qquad \text{Equation 3}$$

where L is the value of inductor 130 (FIGS. 1, 2 and 3) and C is the value of capacitor 140 (FIGS. 1, 2 and 3). For increased resolution, in some embodiments, more bits can be added to counter 410, and correspondingly more resistors for variable resistor 320.

In some exemplary embodiments of the present invention, the following exemplary values can be used: $V_{out}$=1.5V; $V_{ref}$=0.5V; ΔV=50 mV; $f_s$=1 MHz; R1=185.7 kΩ; R'2=90 kΩ; each R0=2 kΩ; R3=189.83 kΩ; R4=94.61 kΩ; and R5=1.27 kΩ. The choice of resistance values can be based on current consumption, area, and the ratio of the resistors. The ratio of R1 and R2, taken together with $V_{ref}$, can decide output voltage $V_{out}$. The ratios of R3, R4 and R5 can decide the accuracy of output voltage $V_{out}$.

Figure 5B:
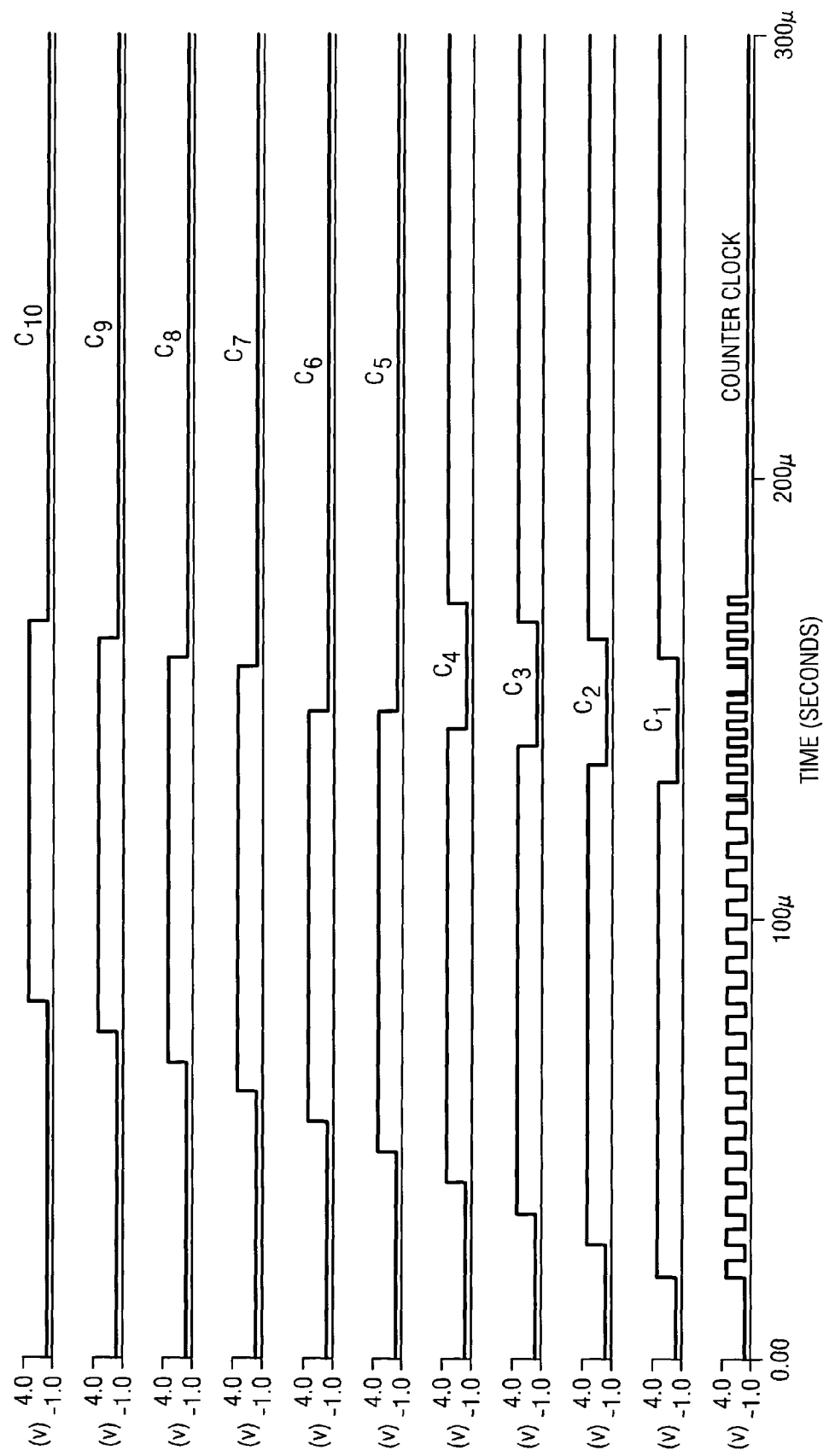
FIG. 5B graphically illustrates waveforms from exemplary embodiments of the present invention.

FIG. 5A graphically illustrates representative output voltages from both conventional buck converters and from exemplary embodiments of the present invention. In FIG. 5A, nominal output voltage $V_{out}$ is 1.5V. Without exemplary embodiments of the present invention, regulation varies considerably, such as from −45 mV to +80 mV. With exemplary embodiments of the present invention, regulation can be more tightly controlled, for example to within +/−10 mV, as illustrated in FIG. 5A. FIG. 5B graphically illustrates representative waveforms from exemplary embodiments of the present invention.

Although exemplary embodiments of the present invention have been described in detail, it will be understood by those skilled in the art that various modifications can be made therein without departing from the spirit and scope of the invention as set forth in the appended claims.

What is claimed is:

1. A power conversion apparatus, comprising:
   a voltage input for receiving an input voltage;
   a voltage output for supplying an output voltage;
   circuitry coupled to said voltage input and said voltage output for producing said output voltage in response to said input voltage, said circuitry including a switch having a control input, said switch responsive to said control input for selectively coupling said voltage input to said voltage output;
   said circuitry including a resistor network connected to said voltage output, said resistor network including a variable resistance element having a control input, said variable resistance element responsive to said control input thereof for establishing a resistance thereof; and
   said circuitry including a first comparator having a first input connected to said resistor network, a second input for receiving a reference signal, and an output connected to said control input of said switch,
   wherein said circuitry includes a controller having an input coupled to said voltage output, and said controller having an output connected to said control input of said variable resistance element, said controller responsive to said output voltage for controlling the resistance of said variable resistance element.

2. The apparatus of claim 1, wherein said controller input is connected to said resistor network.

3. The apparatus of claim 1, wherein said controller includes a frequency input for receiving a signal having a predetermined frequency, said controller responsive to said predetermined frequency signal for controlling the resistance of said variable resistance element.

4. The apparatus of claim 3, wherein said controller includes a frequency divider coupled to said frequency input for dividing said predetermined frequency signal to produce a divided frequency signal, said controller responsive to said divided frequency signal for controlling the resistance of said variable resistance element.

5. The apparatus of claim 4, wherein said frequency divider includes a flip-flop.

6. The apparatus of claim 3, wherein said controller includes a counter, said counter having a count input coupled to said frequency input, a data input coupled to said resistor network, and an output coupled to said control input of said variable resistance element.

7. The apparatus of claim 6, wherein said counter includes a plurality of series-connected flip-flops, each of said flip-flops having a clock input connected to said count input.

8. The apparatus of claim 1, wherein said resistor network is for deriving upper and lower voltage levels based on said output voltage, wherein said circuitry includes a second comparator having a first input connected to said resistor network for receiving said upper voltage level, a second input for receiving a reference voltage, and an output coupled to said controller input, and wherein said circuitry includes a third comparator having a first input connected to said resistor network for receiving said lower voltage level, a second input for receiving said reference voltage, and an output coupled to said controller input.

9. The apparatus of claim 8, wherein said controller includes a counter having a data input, and having an output coupled to said control input of said variable resistance element, said controller including logic coupled between said controller input and said data input for producing a data signal in response to said outputs of said second and third comparators.

10. The apparatus of claim 9, wherein said resistor network includes first and second voltage dividers connected to said voltage output, one of said voltage dividers including said variable resistance element, said first input of said first comparator connected to said variable resistance element, and said first inputs of said second and third comparators connected to said second voltage divider.

11. The apparatus of claim 9, wherein said controller includes a frequency input for receiving a signal having a predetermined frequency, and wherein said counter includes a count input, said controller including further logic coupled between said count input and said inputs of said controller for producing a count signal for said counter in response to said predetermined frequency signal and said outputs of said second and third comparators.

12. The apparatus of claim 1, wherein said variable resistance element includes a plurality of series-connected resistances and a plurality of switches, each of said switches connected in parallel with a respectively corresponding one of said series-connected resistances.

13. The apparatus of claim 1, wherein said resistor network includes first and second voltage dividers connected to said voltage output, one of said voltage dividers including said variable resistance element, said first input of said first comparator connected to said variable resistance element.

14. The apparatus of claim 1, wherein said reference signal is a periodic voltage ramp signal.

15. A power conversion apparatus, comprising:
a voltage input for receiving an input voltage;
a voltage output for supplying an output voltage;
circuitry coupled to said voltage input and said voltage output for producing said output voltage in response to said input voltage, said circuitry including a switch having a control input, said switch responsive to said control input for selectively coupling said voltage input to said voltage output;
said circuitry including a resistor network connected to said voltage output, said resistor network including a variable resistance element having a control input, said variable resistance element responsive to said control input thereof for establishing a resistance thereof; and
said circuitry including a first comparator having a first input connected to said resistor network, a second input for receiving a reference signal, and an output connected to said control input of said switch,
wherein said variable resistance element includes a plurality of series-connected resistances and a plurality of switches, each of said switches connected in parallel with a respectively corresponding one of said series-connected resistances, and
wherein each of said plurality of switches includes a control input, and wherein said control inputs of said plurality of switches define said control input of said variable resistance element.

16. The apparatus of claim 15, wherein said circuitry includes a plurality of flip-flops, each of said flip-flops having a data output coupled to a respectively corresponding one of said control inputs of said plurality of switches.

17. A method of power conversion, comprising:
supplying an input voltage to a switch;
controlling operation of the switch to produce an output voltage;
using a resistor network and the output voltage to produce a feedback voltage, including varying a variable resistance within the resistor network; and
said controlling step including controlling operation of the switch based on the feedback voltage,
wherein said varying step includes varying the variable resistance based on the output voltage.

18. The method of claim 17, wherein said varying step includes varying the variable resistance based also on a predetermined frequency.

19. The method of claim 18, including using the output voltage to produce upper and lower voltage levels, and comparing each of the upper and lower voltage levels to a reference voltage.

20. The method of claim 19, wherein said varying step includes varying the variable resistance based on comparison results of said comparing step and also based on said predetermined frequency.

21. The method of claim 19, wherein said last-mentioned using step includes dividing the output voltage to produce the upper and lower voltage levels.

* * * * *